United States Patent
Schwarz et al.

[11] Patent Number: 5,654,911
[45] Date of Patent: *Aug. 5, 1997

[54] CARRY SELECT AND INPUT SELECT ADDER FOR LATE ARRIVING DATA

[75] Inventors: Eric Mark Schwarz, Gardiner; Robert Michael Bunce, Hopewell Junction, both of N.Y.

[73] Assignee: International Business Machines Corporation, Armonk, N.Y.

[*] Notice: The term of this patent shall not extend beyond the expiration date of Pat. No. 5,619,443.

[21] Appl. No.: 472,962

[22] Filed: Jun. 7, 1995

Related U.S. Application Data

[62] Division of Ser. No. 414,062, Mar. 31, 1995.

[51] Int. Cl.[6] .................................................. G06F 7/50
[52] U.S. Cl. ................................................... 364/788
[58] Field of Search .................................. 364/788, 787, 364/786

[56] References Cited

U.S. PATENT DOCUMENTS

| | | | |
|---|---|---|---|
| 4,608,693 | 8/1986 | Baranyai et al. | 371/49 |
| 4,769,779 | 9/1988 | Chang et al. | 364/754 |
| 4,939,687 | 7/1990 | Hartley et al. | 364/757 |
| 5,163,020 | 11/1992 | Chau | 364/788 |
| 5,272,662 | 12/1993 | Scriber et al. | 364/788 |
| 5,283,755 | 2/1994 | Bechade | 364/757 |
| 5,396,445 | 3/1995 | Lal | 364/788 |
| 5,434,810 | 7/1995 | Goto et al. | 364/788 |
| 5,471,414 | 11/1995 | Kumar et al. | 364/788 |

*Primary Examiner*—David H. Malzahn
*Attorney, Agent, or Firm*—Lynn L. Augspurger; David V. Rossi

[57] ABSTRACT

An adder which takes advantage of the early arriving bits of a time skewed operand to provide a result to an add or substract operation without additional latency. Possible partial results are calculated and then selectively combined according to the late arriving data as the late arriving data becomes available. In an embodiment of the present invention, a first operand is partitioned into groups according to the arrival time of the skewed data, and possible partial results for each group are calculated for the full range of partial inputs that affect it. In addition, the high order groups are calculated with and without a borrow (carry) which is propagated from a low order group. Once the delayed partial operands are known and the borrows (carrys) determined the partial results are gated through multiplexers according to the borrows and partial results, and thus the result is provided with a delay similar to the delay in arrival of the skewed operand.

8 Claims, 3 Drawing Sheets

CARRY SELECT AND INPUT SELECT ADDER FOR LATE ARRIVING DATA

This is a divisional of co-pending application Ser. No. 08/414,062 filed Mar. 31, 1995.

FIELD OF THE INVENTION

The present invention relates to computer architecture and data processing and more particularly, to a method and apparatus for performing addition of operands.

BACKGROUND OF THE INVENTION

In hardware design it is sometimes necessary to implement a binary add or subtract function where one of the inputs has a skewed arrival time. If the least significant bits of either of the operands arrives the latest, a conventional adder will not be able to execute concurrently with any other prior computation. The total latency of the system (defined to be the adder and the calculation which is skewing the arrival of an input) will need to include a full adder delay.

An example of having a skewed input adder is the exponent update during normalization of a floating point number. The fraction shift amount needs to be subtracted from the input exponent. The input exponent is known prior to any bits of the shift amount given that the shift amount is determined from a leading zero detect of the data being normalized. Also, the shift amount's most significant bits are available earlier than the least significant. A method and system for performing exponent update in parallel with shifting the fraction during normalization of a floating point number has been disclosed by the present inventors in commonly assigned U.S. patent application Ser. No. 08/414,072, filed Mar. 31, 1995 and which is hereby incorporated by reference.

As mentioned, however, in hardware design there are many situations where late arriving data can introduce additional latency. There is a need, therefore, for an improved adder/subtractor which does not introduce latency due to late arriving data.

SUMMARY OF THE INVENTION

The present invention provides an adder or subtractor which takes advantage of the early arriving bits to provide a result to an add or subtract operation without additional latency by performing computation concurrently with other computations that are associated with the delay in the arrival of the bits of an operand. In accordance with the methodology of the present invention, in order to calculate the result of an addition or subtraction of two operands, where a first operand arrives at the adder in time delayed groups, several possible partial results are calculated and then selectively combined according to the late arriving data as the late arriving data becomes available. In an embodiment of the present invention, a first operand is partitioned into groups according to the arrival time of the skewed data, and possible partial results for each group are calculated for the full range of partial inputs that affect it. In addition, the high order groups are calculated with and without a borrow (carry) which is propagated from a low order group. Once the delayed partial operands are known and the borrows (carrys) determined the partial results are gated through multiplexers according to the borrows and partial results, and thus the result is provided with a delay similar to the delay in arrival of the skewed operand.

BRIEF DESCRIPTION OF THE DRAWINGS

Additional aspects, features, and advantages of the invention will be understood and will become more readily apparent when the invention is considered in the light of the following description made in conjunction with the accompanying drawings, wherein:

FIG. 4 diagramatically illustrates the partioning of the operands into groups in accordance with an embodiment of the present invention.

DETAILED DESCRIPTION OF THE INVENTION

A methodology associated with an embodiment of the present invention may be described by the following steps.

1. Isolate the varying arrival input bits into groups based on their arrival times.
2. Determine all the possible combinations of input bits per group which can update (add to or subtract from) the non-skewed input and include an additional borrow combination for subtraction or carry in combination for addition.
3. Once all the combinations are known per group, actually calculate all the possible results per group. Include a borrow indicator bit or carry indicator bit for all the low order groups.
4. Then, the resulting possible sums are selected once the delayed input bits arrive. For the higher order groups two possible results are multiplexed: for addition, with and without a carry-in to the group; and for subtraction, with and without borrow.
5. Once a low order group's output has been selected based on the input selects signal, use its borrow of carry indicator bit to choose which of the next more significant group's results should be multiplexed. Do this for ever group starting at the least significant.

Figure 1:
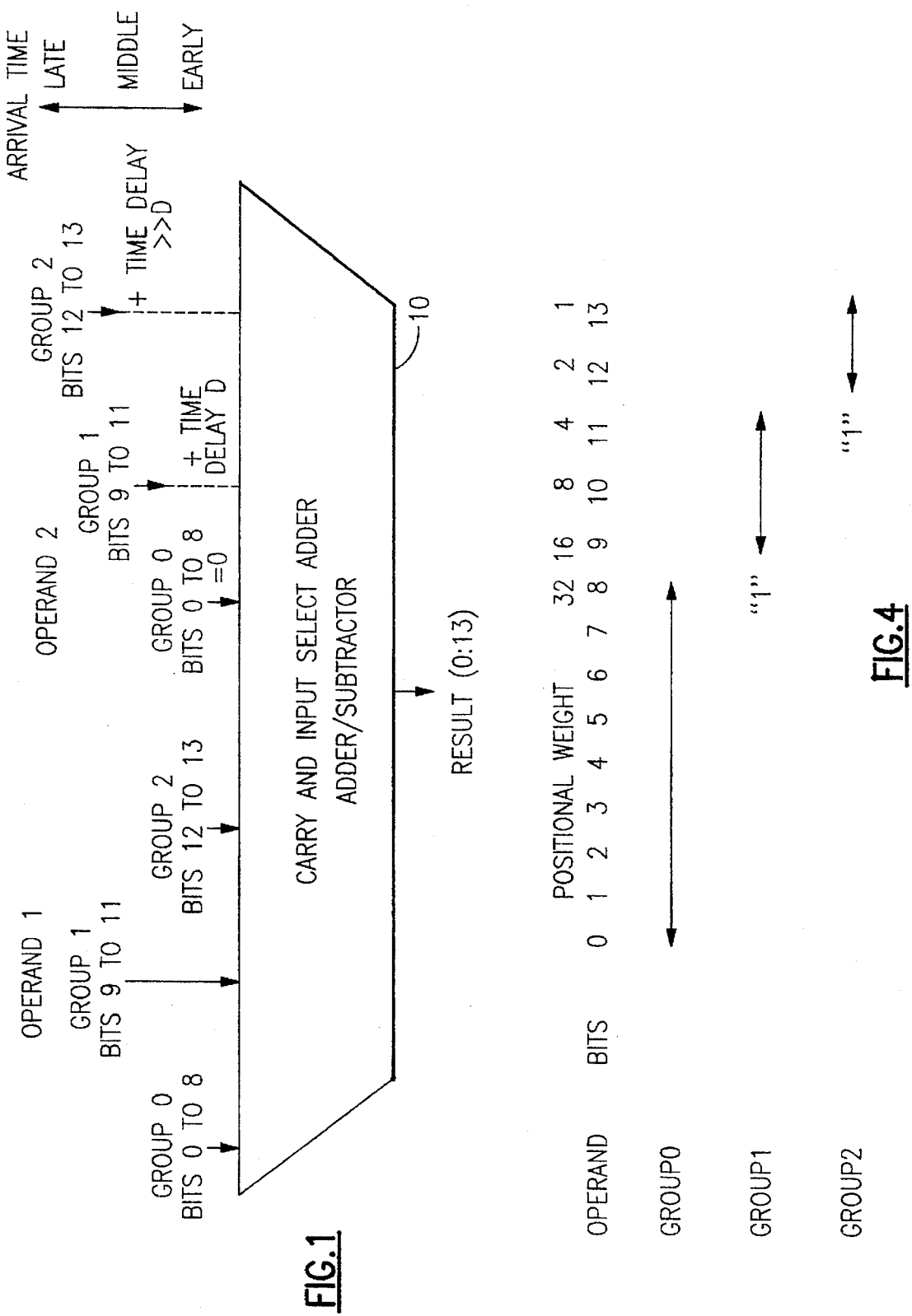
FIG. 1 illustrates a Carry and Input Select Adder 10 according to the present invention.

FIG. 1 illustrates a Carry and Input Select Adder 10 according to the present invention. As shown, 14 bit operand 1 comprising GROUP0 through GROUP2, and 14 bit operand 2 comprising GROUP0 through GROUP2 are input to Carry and Input Select Adder 10, which provides 14 bit Result(0:13) as an output which is either the sum or difference of operand 1 and operand 2, depending on the application or implementation. The groups of operand 1 are shown to arrive at the adder input substantially simultaneously, while those of operand 2 are skewed in time. Specifically, OP2_GROUP0=OP2(0:8) arrives at substantially the same time as operand 1, while OP2_GROUP1= OP2(9:11) arrives after a delay of D, and OP2_GROUP2= OP2(12:13) arrives after a delay greater than D, where OPx_GROUPy refers to group y of operand x and OP2(i:j) refers to bits i through j of operand 2 (bit 0 being the most significant bit). The adder is referred to as a Carry and Input Select adder since not only is selection based on a carry signal (e.g., conventional adder), but also on the delayed input.

Based on the arrival time based partitioning of OP2, OP1 is preferably partitioned to match the partitioning OP2, as shown in FIG. 1, since each group of OP1 will then be directly affected only by the corresponding group of OP2 (excluding carry/borrow considerations). That is, OP1 bits are separated into groups of bits of according to different OP2 group arrival times. As may be appreciated, the relative arrival time delays of bits for a given operand, the relative arrival time between bits of different operands, as well as the time required for calculations by carry and input select adder 10 relative to the operand bit arrival time are factors that may be considered when determining partitioning of an operand into groups.

For purposes of clarity of exposition, the description of Carry and Input Select Adder 10 described hereinbelow assume that the desired function is subtraction of operand 2 from operand 1. One skilled in the art recognizes, however, that embodiments of the present invention apply, and may readily be adapted to an addition or subtraction operation due to the complementary relationship between addition and subtraction. Also, for the example discussed, the operands have 14 bits, but the invention is applicable to any width operands, to any radix, and to operands of different width. Also for purposes of clarity of exposition, it is assumed in the described example that OP2_GROUP0 is always zero, as shown in FIG. 1, and thus, providing Result(0:13) involves a subtraction of an amount between 0 to 31 from OP1.

FIG. 4 diagramatically illustrates the partitioning of the operands into groups. Note that in addition to the bits corresponding to the operand value itself, each group except GROUP0 is considered to include a concatenated '1' bit in a bit position one more significant than the most significant bit of that group. This bit is a borrow indicator bit (for subtraction) for the group, and indicates whether a borrow is needed from the next more significant group. In this implementation, described further hereinbelow, a "1" indicates no borrow is needed, and a "0" indicates that a borrow is necessary from next more significant group. For addition, a "0" is instead concatenated to the most significant bit of the group as a carry indicator bit, wherein a carry indicator bit of "1" indicates a carry-in is needed into the next higher group, and "0" indicates that no carry-in is needed.

Figure 2:
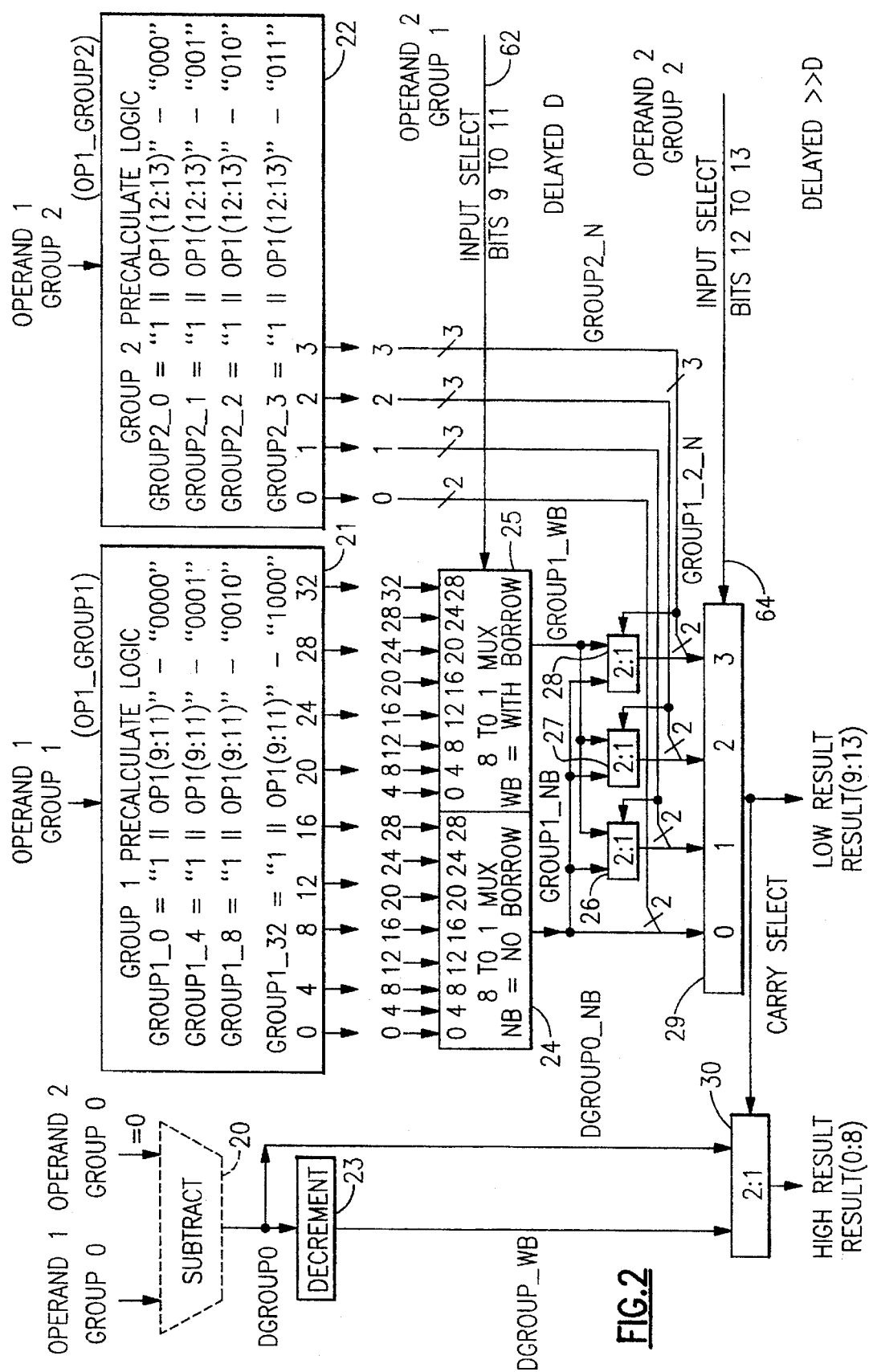
FIG. 2 illustrates an implementation which provides a dataflow in accordance with the present invention.

In accordance with the present invention, for each group (including the borrow indicator bit) of OP1 all possible partial results are calculated. As the delayed OP2 groups arrive, these precalculated possible partial results for each group are selectively combined, ultimately providing a full Result upon arrival of the latest group of OP2. FIG. 2 illustrates an implementation which provides such a dataflow in accordance with the present invention.

For the high order GROUP0, subtractor 20 is provided to generate a signal value DGROUP0 equal to OP2_GROUP0 subtracted from OP1_GROUP0. This signal value DGROUP0 will either remain the same or be decremented for the two possibilities corresponding to whether or not GROUP1 requires a borrow from GROUP0. Accordingly, decrementer 23 is employed in order to provide the possible partial result DGROUP0_WB(0:8), which corresponds to the decremented DGROUP0(0:8) for the case of a borrow. DGROUP0_WB(0:8) and DGROUP0_NB(0:8) (i.e. denoting DGROUP0 with no borrow, equal to DGROUP0 (0:8)) are input to 2-to-1 multiplexer 30 which is used to select between these two signals when it is known whether a borrow is required from GROUP0. Since, however, OP2_GROUP0 equals zero in this example, subtractor 20 may be eliminated from the implementation with GROUP0 of operand 1 being routed directly into decrementer 23 and multiplexer 30.

The next group of operand 1 bits, OP1_GROUP1(0:3), are altered by the possible values of OP2_GROUP1, in which the possible values for the OP2_GROUP1 bits is any multiple of 4 from 0 to 28. Accordingly, GROUP1 precalculate logic 21 provides the resulting partial results for any of these OP2_GROUP1 bit values and the maximum OF2_GROUP1 amount (28) plus a borrow which is equivalent to subtracting 32. Thus, 9-4 bit signals are created corresponding to each amount that may be subtracted from OP1_GROUP2: GROUP1_0, GROUP1_4, GROUP1_8, ..., GROUP1_28, and GROUP1_32, where the notation GROUPM_N, refers to OP1_GROUPM calculated according to OP2_GROUP1 having a value of N (i.e., subtracting N from OPI_GROUP1.

The last group of operand bits, GROUP2(0:2), are altered by the GROUP2 bits of operand 2, which may have a value of 0, 1, 2, or 3. The corresponding possible values of OP1_GROUP2 for each of these possible OP2_GROUP2 values are calculated and there is no need to create one corresponding to an additional borrow since this is the lowest order group. Thus, GROUP2_0, GROUP2_1, GROUP2_2, and GROUP2_3 represent the resulting calculated 3 bit signals.

As may be appreciated, for each group, the corresponding precalculate logic generates each appropriate possible partial result signal, including the borrow indicator bit, as logical functions of combinations of the bits in the group based on the effect of a subtraction on those bits. For example, each bit of the signal GROUP1_8 may be represented as follows. GROUP1_8(3)=OP1_GROUP1(3), where the parenthetical value identifies the bit of the named group (the most significant bit of the group identified as bit 0). GROUP1_8(2)=OP_GROUP1(2)' where ' represents an inversion. GROUP1_8(1)=OP_GROUP1(1) xnor OP_GROUP1(2) where xnor represents an exclusive-NOR operation. GROUP1_8(0) equals OP_GROUP1(1) OR OP_GROUP1(2) where "OR" represents the logical OR operation. In this manner all the resulting combination signals are created.

The GROUP1 signals are input to multiplexers 24 and 25 and are multiplexed according to select signal input on line 62 which is the signal OP2_GROUP1. That is, multiplexers 24 and 25 select a shift input of 0, 4, 12, 16, 20, 24, or 28 when OP2_GROUP1 bits arrive at Carry and Input Select adder 10, and are provided to multiplexers 24 and 25 in order to select a shift input. The two 4 bit 8-to-1 multiplexers 24 and 25 are required to provide GROUP1 with a borrow (denoted GROUP1_WB) and without a borrow (denoted GROUP1_NB) at the multiplexer outputs. Specifically, GROUP1_0, GROUP1_4, GROUP1_8, ..., GROUP1_28 are fed to multiplexer 24 which creates GROUP1_NB, and GROUP1_4, GROUP1_8, GROUP1_12, ..., GROUP1_32 are fed to the multiplexer 25 (where GROUP1_N signal is input to the shift N-4 input of multiplexer 25) which creates GROUP1_WB.

The selected GROUP1 signals are concatenated with GROUP2 signals to provide new signals which are a combination of the two and are denoted by GROUP1_2_n where n is the subtract amount of the group 2 signal (i.e., corresponding to GROUP2_n, which is OP1_GROUP2 minus n). Thus, for the possible partial result signals of GROUP2 corresponding to OP2_GROUP2 amounts of 1, 2, or 3 (i.e., GROUP2_N, N=1, 2, 3), a 2 to 1 multiplexer (i.e., multiplexers 26, 27, and 28) is provided to to choose GROUP1_NB or GROUP1_WB. The respective GROUP2 borrow indicator bit (denoted GROUP2_N(0), N=1,2,3) is used as selection signal to choose the next higher group with or without a borrow. If the bit is a "1" no borrow is needed and GROUP1_NB is chosen, else "0" and a borrow was used and GROUP1_WB should be chosen. For the possible partial result signal GROUP2_0 no 2:1 multiplexer is needed because a subtracting 0 from OP1_GROUP2 necessarily cannot produce a borrow needed from GROUP1; thus, GROUP1_2_0=(GROUP1_NB(0:3)|| GROUP2_0 (1:2), where || represents concatenation). Note that the borrow indicator bit is dropped from the lower group (GROUP1) when combined with a high group of bits. Thus, implementation of this step uses 3–2 to 1 select gates to merge GROUP1 to GROUP2 signals forming GROUP1_2_0(0:5), GROUP1_2_1(0:5), GROUP1_2_2(0:5), and GROUP1_2_3(0:5).

These four combinations of GROUP1 and GROUP2 signals are fed into a 6 bit 4 to 1 multiplexer 29. The appropriate combination is selected according to delayed input OP2_GROUP2 which is input as the select signal of multiplexer 29. Bit 0 of multiplexer 29 output is a borrow indicator bit from the GROUP1 signal and the low order 5 bits (i.e., bits 1 through 5) are the actual low order bits of the result of the subtraction operation, designated as RESULT (9:13).

The borrow indicator bit out of the 4 to 1 multiplexer is used as a select signal for 9 bit 2:1 multiplexer 30 in order to select the high order bits as either one of DGROUP0_WB(0:8) and DGROUP0_NB(0:8). In accordance with the designated logic, if the borrow bit is a "1" then no borrow was used and OUT_EXP(0:8)=GROUP0_NB(0:8), else OUT_EXP=GROUP0_WB(0:8).

Therefore, it may be understood that the present invention provides a result to an addition (subtraction) operation at substantially the same time as when the late arriving data becomes entirely available. More particularly, the Carry Select and Input Select Adder 10 embodiment of the present invention shown in FIG. 2, results in approximately the delay of the latest arriving data plus one 2 to 1 multiplexer delay in block 30. Also, there can be a slight delay due to the 2 to 1 multiplexing through parallel configured multiplexers 26, 27, and 28 of the GROUP1 signals with and without a borrow.

Figure 3:
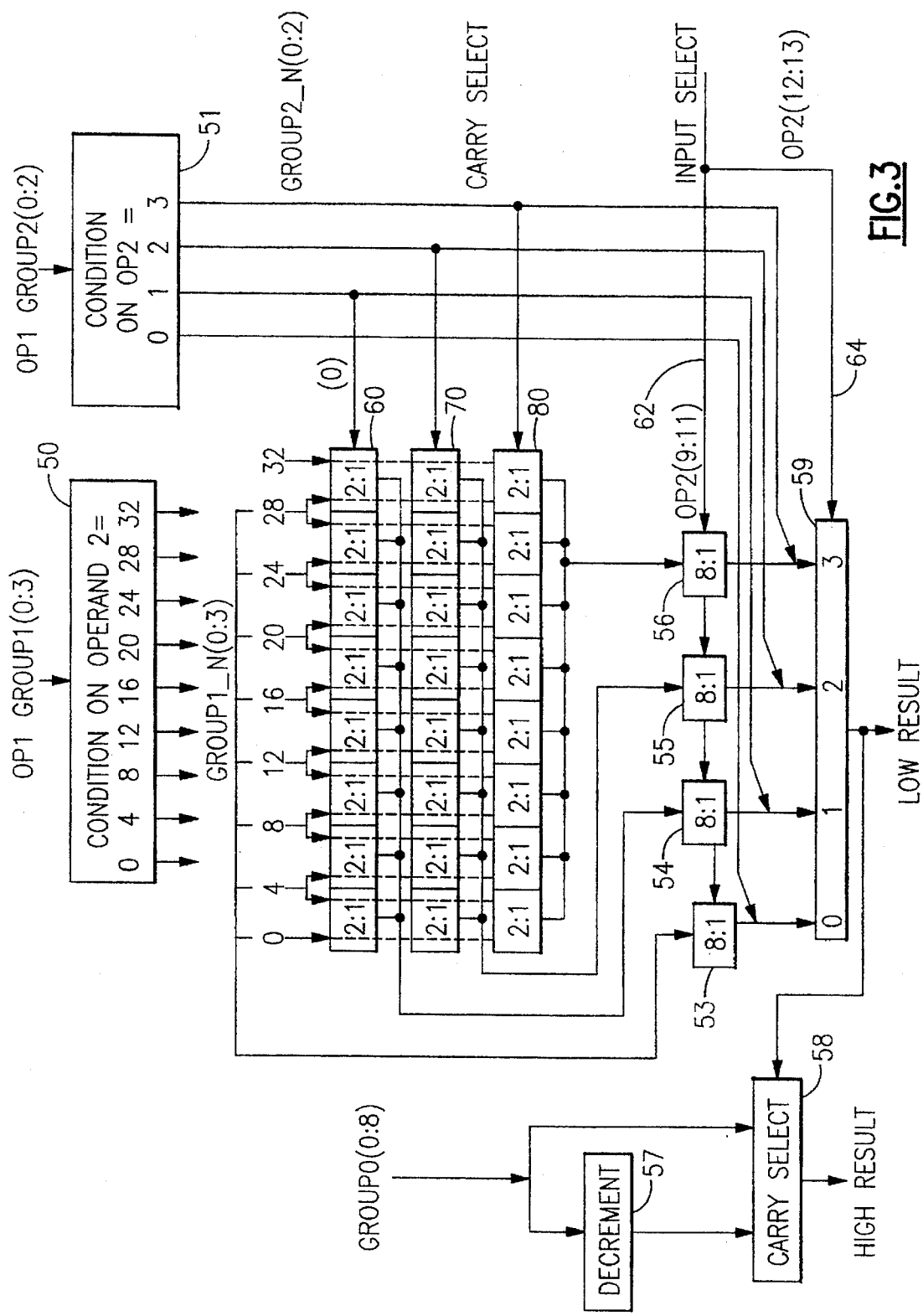
FIG. 3 illustrates another implementation which provides a dataflow in accordance with the present invention.

FIG. 3 depicts another embodiment of the present invention, in which the propagation delay due to the 2 to 1 multiplexing, 26, 27, and 28, in the embodiment of FIG. 2 is eliminated by effectively moving the 2 to 1 selectors (multiplexers) before the 8 to 1 multiplexers. This implementation thus requires 4-8 to 1 multiplexers 53, 54, 55, 56 and 24-2 to 1 multiplexers, illustrated as three row multiplexers 60, 70, and 80, each row multiplexer having 8 2-to-1 multiplexers, rather than 2-8 to 1 and 3-2 to 1 multiplexers as in FIG. 2. Note, however, that these multiplexers are very small. More particularly, the difference between the two embodiments shown is the ordering of carry selection versus the input selection. The embodiment of FIG. 2 performs an input selection (8 to 1 mux), a carry selection (2 to 1 mux), an input selection (4 to 1 mux), and then a carry selection (2 to 1). The embodiment of FIG. 3 is more costly but faster and places the first carry selection stage prior to the first input selection. Thus, the embodiment of FIG. 3 orders the selection: carry (2 to 1), input (8 to 1), input (4 to 1), and then final carry (2 to 1).

It may be understood, therefore, that the present invention features a very fast adder function for the situation where data has time skew among the bits of the data. The present invention can be applied to any binary adder design for any radix (i.e. binary or hex) and also for any implementation (i.e. a normalizer or any other function).

Although the above description provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages. It is therefore intended that the present invention is not limited to the disclosed embodiments but should be defined in accordance with the claims which follow.

What is claimed is:

1. A method for providing a sum of a first operand and a second operand in an adder circuit, said first operand including a plurality of first input groups of bits, each of said first input groups arriving at the adder circuit at a respective arrival time, said method comprising the steps of:

receiving said second operand at the adder circuit, said second operand partitioned into a plurality of second operand groups of bits according to said first input groups;

generating for each one of said second operand groups a possible group output signal for each possible value of a corresponding first input group and each value of a carry-in/borrow signal from a next lower significant group for each said possible value; and providing said sum by selectively combining signals corresponding to said possible group output signals for each group in response to receiving said first input bit groups.

2. The method of claim 1, wherein said sum is provided at a time substantially equal to receiving a last one of said first input bit groups.

3. The method of claim 1, wherein said sum equals an addition of said first operand and said second operand, and said carry-in/borrow signal is a carry-in signal.

4. The method of claim 1, wherein said sum equals a subtraction between said first operand and said second operand, and said carry-in/borrow signal is a borrow signal.

5. A method to provide a sum of a first operand and a second operand in an adder circuit, said first operand characterized by arrival at the adder circuit in time delayed sets of bits of said first operand, each of said first and second operands partitioned into corresponding groups of bits according to said time delayed sets of bits, bits of said second operand arriving as an input to said said adder circuit before a latest one of said sets of bits, said method comprising the steps of:

precalculating, for each group, each possible partial result corresponding to a partial sum of said second operand for the group and each possible value of said group for said first operand and each value of a carry-in/borrow signal from a next lower significant group for each said possible value; and selectively combining signals corresponding to one of the possible partial results for each group in response to arrival of each successive said sets of bits of said first operand to provide said sum.

6. The method of claim 5, wherein said sum is provided at a time substantially equal to receiving a last one of said sets of bits.

7. The method of claim 5, wherein said sum equals an addition of said first operand and said second operand, and said carry-in/borrow signal is a carry-in signal.

8. The method of claim 5, wherein said sum equals a subtraction between said first operand and said second operand, and said carry-in/borrow signal is a borrow signal.

* * * * *